US011254049B2

(12) United States Patent
Matsubara et al.

(10) Patent No.: US 11,254,049 B2
(45) Date of Patent: Feb. 22, 2022

(54) OPTICAL FABRICATING APPARATUS AND OPTICAL FABRICATING METHOD

(71) Applicant: SHASHIN KAGAKU CO., LTD., Kyoto (JP)

(72) Inventors: Akio Matsubara, Kyoto (JP); Tamotsu Katayama, Kyoto (JP); Masami Tamamizu, Kyoto (JP); Akihiro Morita, Kyoto (JP); Takahiro Uno, Kyoto (JP)

(73) Assignee: SHASHIN KAGAKU CO., LTD.

( * ) Notice: Subject to any disclaimer, the term of this patent is extended or adjusted under 35 U.S.C. 154(b) by 285 days.

(21) Appl. No.: 16/323,439

(22) PCT Filed: Aug. 4, 2017

(86) PCT No.: PCT/JP2017/028468
§ 371 (c)(1),
(2) Date: Feb. 5, 2019

(87) PCT Pub. No.: WO2018/026011
PCT Pub. Date: Feb. 8, 2018

(65) Prior Publication Data
US 2019/0160743 A1 May 30, 2019

(30) Foreign Application Priority Data

Aug. 5, 2016 (JP) .............................. JP2016-154449

(51) Int. Cl.
B29C 64/205 (2017.01)
B33Y 10/00 (2015.01)
(Continued)

(52) U.S. Cl.
CPC ............ *B29C 64/205* (2017.08); *B29C 64/20* (2017.08); *B29C 64/35* (2017.08);
(Continued)

(58) Field of Classification Search
CPC ....... B29C 64/205; B29C 64/35; B29C 64/20; B29D 11/0073; B33Y 10/00; B33Y 40/00; B33Y 30/00
See application file for complete search history.

(56) References Cited

U.S. PATENT DOCUMENTS 5,650,260 A 7/1997 Onishi .......................... 430/269
6,656,410 B2 * 12/2003 Hull ....................... B33Y 10/00
264/401
(Continued)

FOREIGN PATENT DOCUMENTS

EP 2 960 718 A1 12/2015
JP 07-108609 A 4/1995
(Continued)

OTHER PUBLICATIONS

International Search Report dated Sep. 5, 2017 in corresponding PCT International Application No. PCT/JP2017/028468.
(Continued)

Primary Examiner — Mathieu D Vargot
(74) Attorney, Agent, or Firm — Ostrolenk Faber LLP

(57) ABSTRACT

A photocurable composition is supplied onto an auxiliary table provided to be capable of being adjacent to a fabrication table. One of the fabrication table and the auxiliary table is moved relative to the other one of the fabrication table and the auxiliary table in an up-and-down direction. The photocurable composition that has been supplied to the auxiliary table is drawn and spread by a recoater on a fabrication surface of the fabrication table or on a cured composition layer. The photocurable composition on the fabrication surface of the fabrication table is exposed by an exposure device, so that a cured composition layer is formed.

13 Claims, 11 Drawing Sheets

(51) Int. Cl.
 *B29C 64/35* (2017.01)
 *B33Y 40/00* (2020.01)
 *B33Y 30/00* (2015.01)
 *B29C 64/20* (2017.01)
 *B29D 11/00* (2006.01)

(52) U.S. Cl.
 CPC .......... *B29D 11/0073* (2013.01); *B33Y 10/00* (2014.12); *B33Y 30/00* (2014.12); *B33Y 40/00* (2014.12)

(56) References Cited

U.S. PATENT DOCUMENTS

| | | | |
|---|---|---|---|
| 2002/0195746 A1 | 12/2002 | Hull et al. | 264/401 |
| 2002/0195747 A1 | 12/2002 | Hull et al. | 264/401 |
| 2009/0261512 A1 | 10/2009 | Morohoshi et al. | 264/401 |
| 2012/0046779 A1* | 2/2012 | Pax | B33Y 10/00 700/112 |
| 2015/0202805 A1 | 7/2015 | Saruhashi et al. | |
| 2016/0067929 A1 | 3/2016 | Park | |

FOREIGN PATENT DOCUMENTS

| | | |
|---|---|---|
| JP | 08-230047 A | 9/1996 |
| JP | 2001-150557 A | 6/2001 |
| JP | 2003-053847 A | 2/2003 |
| JP | 2006-272917 A | 10/2006 |
| JP | 2007-055108 A | 3/2007 |
| JP | 2007-055109 A | 3/2007 |
| JP | 2008-184622 A | 8/2008 |
| JP | 2014-226780 A | 12/2014 |
| JP | 2015-136857 A | 7/2015 |
| JP | 2016-020474 A | 2/2016 |
| JP | 2016-055625 A | 4/2016 |
| JP | 2016-078306 A | 5/2016 |

OTHER PUBLICATIONS

Written Opinion dated Sep. 5, 2017 in corresponding PCT International Application No. PCT/JP2017/028468.
Decision to Grant dated Oct. 30, 2018 in corresponding Japanese Patent Application No. 2016-154449.

* cited by examiner

OPTICAL FABRICATING APPARATUS AND OPTICAL FABRICATING METHOD

CROSS-REFERENCE TO RELATED APPLICATIONS

The present application is a 35 U.S.C. §§ 371 national phase conversion of PCT/JP2017/028468, filed Aug. 4, 2017, which claims priority to Japanese Patent Application No. 2016-154449, filed Aug. 5, 2016, the contents of both of which are incorporated herein by reference. The PCT International Application was published in the Japanese language.

TECHNICAL FIELD

The present invention relates to an optical fabricating apparatus and an optical fabricating method for manufacturing a three-dimensional fabrication object.

BACKGROUND ART

As an apparatus for manufacturing three-dimensional fabrication objects, optical fabricating apparatuses have been known (see Patent Documents 1, 2, for example). In the optical fabricating apparatuses described in Patent Documents 1, 2, a predetermined amount of a photocurable resin liquid is supplied onto a fabrication table and then drawn and spread by a recoater to be applied onto the fabrication table. Next, a liquid surface of the photocurable resin liquid is irradiated with a light ray. Thus, the photocurable resin liquid is cured, and a first cured resin layer is formed.

Subsequently, the photocurable region liquid is supplied to the outside of the first cured resin layer, and then the photocurable resin liquid is applied onto the first cured resin layer by the recoater. Thereafter, the liquid surface of the photocurable resin liquid is irradiated with a light ray, whereby a second cured resin layer is formed on the first cured resin layer. The similar operation is repeated, so that a fabrication object made of a plurality of cured resin layers is manufactured.

[Patent Document 1] JP 2007-55108 A
[Patent Document 2] JP 2007-55109 A

SUMMARY OF INVENTION

Technical Problem

In the manufacture of a fabrication object by the optical fabricating apparatuses described in Patent Documents 1 and 2, an uncured resin liquid is present outside of each cured resin layer. In this state, a new photocurable resin liquid that has been supplied onto the uncured resin liquid outside of each cured resin layer is drawn and spread on the cured resin layer by the recoater. However, because the shape of the uncured resin liquid is not maintained, the higher the height of a fabrication object is, the more difficult it is to draw and spread a new photocurable resin liquid that has been supplied onto the uncured resin liquid on the cured resin layer by the recoater. Therefore, it is difficult to manufacture a fabrication object that is large in a height direction.

An object of the present invention is to provide an optical fabricating apparatus that can easily manufacture a fabrication object that is large in a height direction, and an optical fabricating method with which the fabrication object that is large in the height direction can be manufactured easily.

Technical Problem (1) An optical fabricating apparatus according to one aspect of the present invention that manufactures a three-dimensional fabrication object by stacking cured composition layers in an up-and-down direction includes a fabrication table that has a fabrication surface, an auxiliary table provided to be capable of being adjacent to the fabrication table, a relative moving means that moves one of the fabrication table and the auxiliary table relative to another one of the fabrication table and the auxiliary table in the up-and-down direction, a supply means that supplies a photocurable composition onto the auxiliary table, a spreading member that draws and spreads the photocurable composition that has been supplied onto the auxiliary table by the supply means on the fabrication surface of the fabrication table or on a cured composition layer, and an exposure means that exposes the photocurable composition on the fabrication surface of the fabrication table to form the cured composition layer.

In this optical fabricating apparatus, the photocurable composition is supplied onto the auxiliary table that is provided to be capable of being adjacent to the fabrication table. One of the fabrication table and the auxiliary table is moved relative to the other one of the fabrication table and the auxiliary table in the up-and-down direction. The photocurable composition that has been supplied to the auxiliary table is drawn and spread on the fabrication surface of the fabrication table or on the cured composition layer by the spreading member. The photocurable composition on the fabrication surface of the fabrication table is exposed by the exposure means, so that the cured composition layer is formed.

With this configuration, even in the case where the number of the stacked cured composition layers is large, when the height of the auxiliary table is adjusted to the height of the top cured composition layer on the fabrication table, the photocurable composition can be drawn and spread on the cured composition layer from the upper surface of the auxiliary table. Thus, a fabrication object that is large in a height direction can be manufactured easily.

(2) The supply means may include a dispenser that has a discharge hole through which the photocurable composition is discharged onto the auxiliary table using a syringe method. In this case, the amount of the photocurable composition to be supplied to the auxiliary table can be regulated easily.

(3) The supply means may further include a cap member that closes the discharge hole of the dispenser at a waiting position where the dispenser waits to supply the photocurable composition. In this case, leakage of the photocurable composition from the discharge hole can be prevented easily. Thus, the amount of the photocurable composition to be consumed can be reduced.

(4) The supply means may further include a temperature regulating member that is attached to the dispenser and regulates a temperature of the photocurable composition. In this case, physicality of the photocurable composition such as viscosity can be maintained suitably.

(5) The optical fabricating apparatus may include a cover supply means that has a roll of a wound elongated cover, wherein the cover supply means may be arranged such that part of the cover is drawable from the roll to cover the fabrication surface of the fabrication table, and the spreading member may draw and spread the photocurable composition that has been supplied to the auxiliary table on the cover on the fabrication surface.

In this case, the fabrication surface of the fabrication table can be protected. Further, a fabrication object can be taken out easily from above the fabrication surface. Further, because the cover can be drawn continuously from the roll, it is not necessary to prepare the cover fitted to the fabrication surface of the fabrication table every time a fabrication object is manufactured. Thus, user friendliness of the optical fabricating apparatus is improved.

(6) The optical fabricating apparatus may further include a cover holding means that holds the cover on the fabrication surface of the fabrication table. In this case, the cover is prevented from being ripped from the fabrication surface.

(7) The fabrication table may further have one or a plurality of suction holes that open in the fabrication surface, and the cover holding means may hold the cover on the fabrication surface by sucking the cover through the one or plurality of suction holes of the fabrication table. In this case, the cover can be held on the fabrication surface of the fabrication table with a simple configuration.

(8) The auxiliary table may have a pressing portion that presses the cover against the fabrication table. In this case, the cover is prevented from deviating from its position on the fabrication surface.

(9) The optical fabricating apparatus may further include a cleaning means that removes the photocurable composition adhering to the spreading member. In this case, the spreading member is maintained clean. Thus, the unnecessary photocurable composition adhering to the spreading member is prevented from dripping on the fabrication surface of the fabrication table or on the cured composition layer.

(10) The cleaning means may include a cup member that is in close proximity to or comes into contact with the spreading member after the photocurable composition is drawn and spread by the spreading member, and a suction device that sucks the photocurable composition adhering to the spreading member into the cup member. In this case, the photocurable composition adhering to the spreading member can be removed with a simple configuration.

(11) An optical fabricating method according to another aspect of the present invention for manufacturing a three-dimensional fabrication object by stacking cured composition layers in an up-and-down direction includes the steps of supplying a photocurable composition onto an auxiliary table provided to be capable of being adjacent to a fabrication table, moving one of the fabrication table and the auxiliary table relative to another one of the fabrication table and the auxiliary table in the up-and-down direction, drawing and spreading the photocurable composition that has been supplied to the auxiliary table on a fabrication surface of the fabrication table or on a cured composition layer by a spreading member, and exposing the photocurable composition on the fabrication surface of the fabrication table by an exposure means and forming the cured composition layer.

With this optical fabricating method, the photocurable composition is supplied onto the auxiliary table provided to be capable of being adjacent to the fabrication table. One of the fabrication table and the auxiliary table is moved relative to the other one of the fabrication table and the auxiliary table in the up-and-down direction. The photocurable composition that has been supplied to the auxiliary table is drawn and spread on the fabrication surface of the fabrication table or on the cured composition layer by the spreading member. The photocurable composition on the fabrication surface of the fabrication table is exposed by the exposure means, so that the cured composition layer is formed.

With this method, even when the number of the stacked cured composition layers is large, the height of the auxiliary table is adjusted to the height of the top cured composition layer on the fabrication table. Therefore, the photocurable composition can be drawn and spread on the cured composition layer from the upper surface of the auxiliary table. Thus, the fabrication object that is large in the height direction can be manufactured easily.

(12) The step of supplying the photocurable composition may include discharging the photocurable composition onto the fabrication table from a discharge hole of a syringe-type dispenser. In this case, the amount of the photocurable composition to be supplied to the auxiliary table can be regulated easily.

Advantageous Effects of Invention

The present invention enables a fabrication object that is large in a height direction to be manufactured easily.

DESCRIPTION OF EMBODIMENTS

An optical fabricating apparatus and an optical fabricating method according to one embodiment of the present invention will be described below with reference to drawings.

(1) Overall Configuration of Optical Fabricating Apparatus

Figure 1:
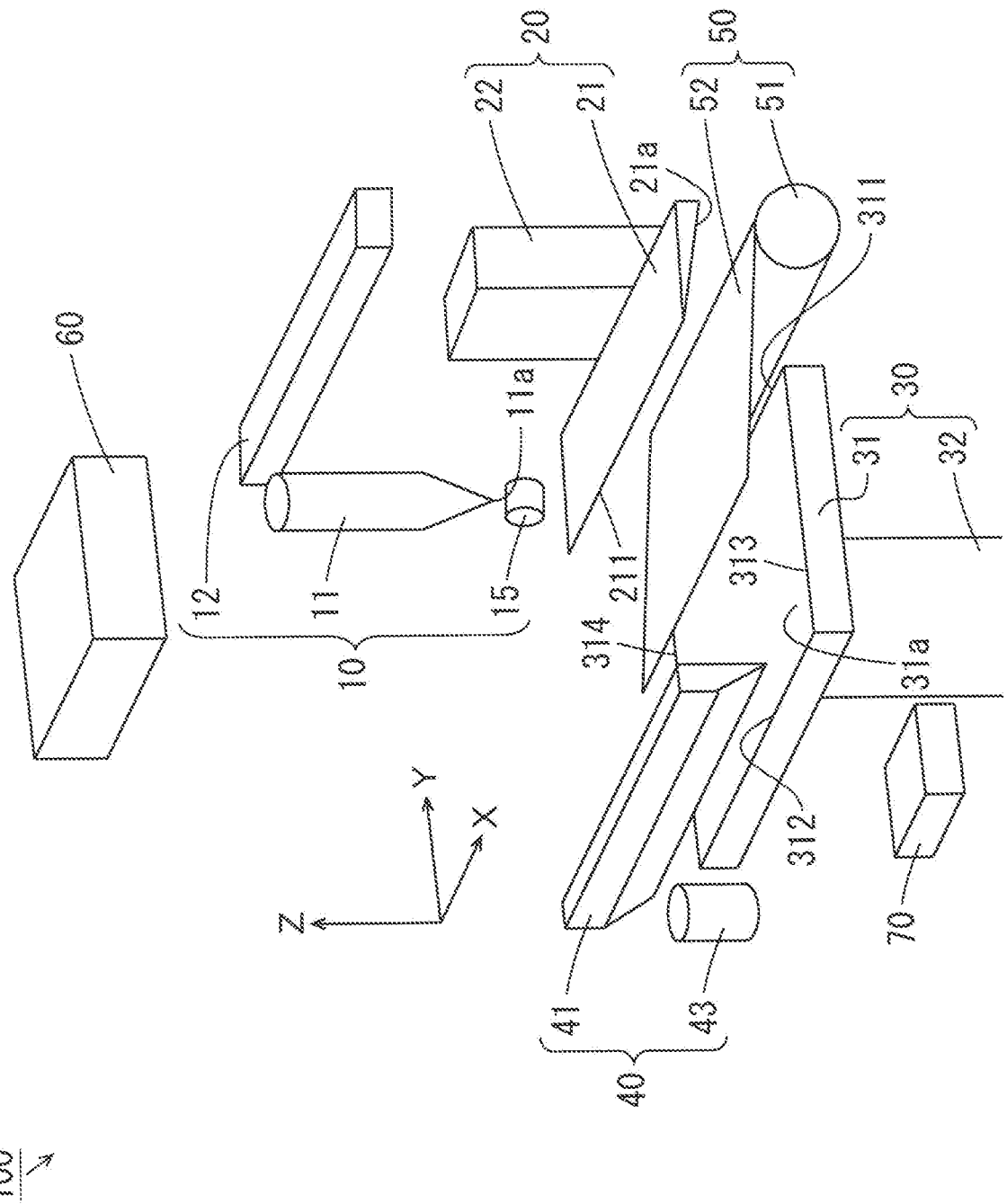
FIG. 1 is a schematic perspective view of an optical fabricating apparatus according to one embodiment of the present invention.
Figure 2:
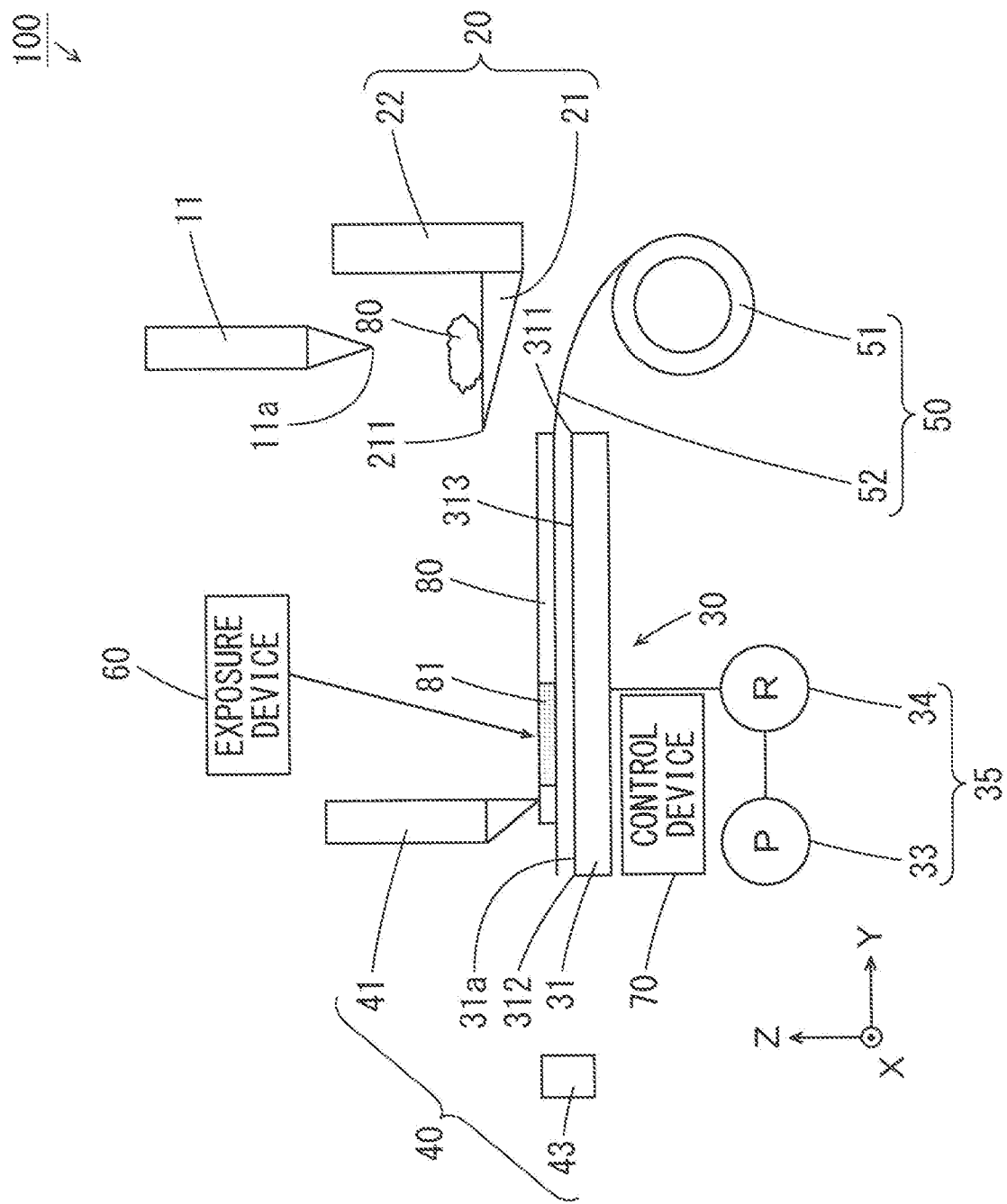
FIG. 2 is a schematic side view of the optical fabricating apparatus of FIG. 1.

FIG. 1 is a schematic perspective view of the optical fabricating apparatus according to the one embodiment of the present invention. FIG. 2 is a schematic side view of the optical fabricating apparatus 100 of FIG. 1. In FIGS. 1 and 2, as indicated by arrows, the directions that are orthogonal to each other in a horizontal plane are referred to as an X direction and a Y direction, and the vertical direction is referred to as a Z direction. This also applies to the subsequent diagrams. As shown in FIGS. 1 and 2, the optical fabricating apparatus 100 includes a material supply unit 10, an auxiliary table unit 20, a fabrication table unit 30, a recoater unit 40, a cover supply unit 50, an exposure device 60 and a control device 70.

The fabrication table unit 30 includes a rectangular fabrication table 31 and a driving device 32. The fabrication table 31 has a pair of edges 311, 312 in parallel to the X direction and another pair of edges 313, 314 in parallel to the Y direction and has an upper surface perpendicular to the Z direction. The upper surface of the fabrication table 31 is a fabrication surface 31a on which a fabrication object is to be manufactured. This fabrication table 31 is held to be movable in the Z direction by the driving device 32.

The auxiliary table unit 20 includes an auxiliary table (a coating table) 21 that extends in the X direction and a driving device 22. The auxiliary table 21 is arranged in close proximity to the edge 311 of the fabrication table 31 and has an edge 211 in parallel to the X direction. This auxiliary table 21 is held to be movable in the Z direction by the driving device 22. Further, a pressing portion 21a that presses a cover of the cover supply unit 50 against the fabrication table 31 is formed on a lower surface of the auxiliary table 21. The auxiliary table 21 has a wedge-shape cross section tapered in a feeding direction of the cover. Thus, the auxiliary table 21 can press the cover by the pressing portion 21a with the cover not caught below the auxiliary table 21.

The material supply unit 10 includes one or a plurality of syringe-type dispensers 11, a driving device 12 and a cap member 15. In the present example, one dispenser 11 is provided. The dispenser 11 has a cylindrical shape extending in the Z direction and stores a photocurable composition 80. Further, in the present example, the cartridge-type photocurable composition 80 fills in the dispenser 11. In this case, the photocurable composition 80 in the dispenser 11 can be replaced easily, and the dispenser 11 can be cleaned easily.

A discharge hole 11a through which the photocurable composition 80 is discharged is formed in a tip (lower end) of the dispenser 11. The driving device 12 supports the dispenser 11 to be movable in the X direction above the auxiliary table 21. The cap member 15 will be described below. As shown in FIG. 2, the photocurable composition 80 to be discharged from the discharge hole 11a of the dispenser 11 is deposited on an upper surface of the auxiliary table 21.

The cover supply unit 50 includes a film roll 51 that extends in the X direction. The film roll 51 is provided in close proximity to the edge 311 of the fabrication table 31. A clear film 52 that has been drawn from the film roll 51 is arranged to cover the fabrication surface 31a of the fabrication table 31 as the cover. In the following description, the fabrication surface 31a covered with the clear film 52 may be simply referred to as the fabrication surface 31a.

As shown in FIG. 1, the recoater unit 40 includes a blade-like recoater 41 that extends in the X direction and a cup member 43. The recoater 41 is held by a driving device (not shown) above the fabrication table 31 to be movable in the Y direction. This recoater 41 is moved from a position above the auxiliary table 21 towards the edge 312 of the fabrication table 31, thereby drawing and spreading the photocurable composition 80 that has been deposited on the auxiliary table 21 on the fabrication surface 31a of the fabrication table 31. The cup member 43 will be described below.

The exposure device 60 is arranged above the fabrication table 31 and cures the photocurable composition 80 on the fabrication surface 31a in a desired shape by exposure. Hereinafter, the cured photocurable composition 80 is referred to as a cured composition layer 81 (see FIG. 2). A plurality of cured composition layers 81 that have been cured in a desired shape are stacked, so that a fabrication object is manufactured.

As shown in FIG. 2, a cover holding unit 35 is provided below the fabrication table 31. The cover holding unit 35 is constituted by a suction device 33 and a pressure regulating device 34 and holds the clear film 52 on the fabrication surface 31a.

In the present example, the control device 70 is arranged below the fabrication table 31. The control device 70 controls the operations of the material supply unit 10, the auxiliary table unit 20, the fabrication table unit 30 including the pressure regulating device 34, the recoater unit 40 and the exposure device 60.

(2) Detailed Configuration of Each Element of Optical Fabricating Apparatus

Figure 3A:
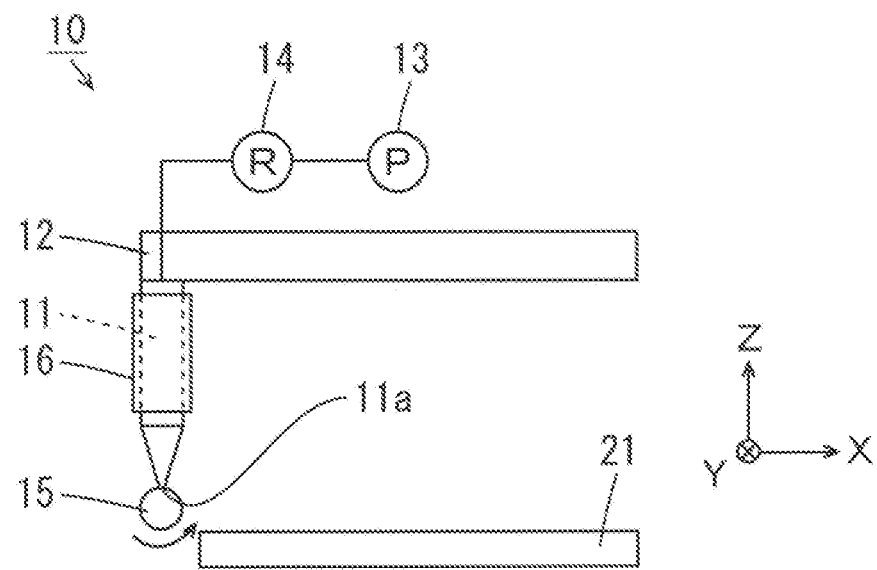
FIGS. 3A and 3B are schematic front views showing a configuration and an operation of a material supply unit.
Figure 3B:
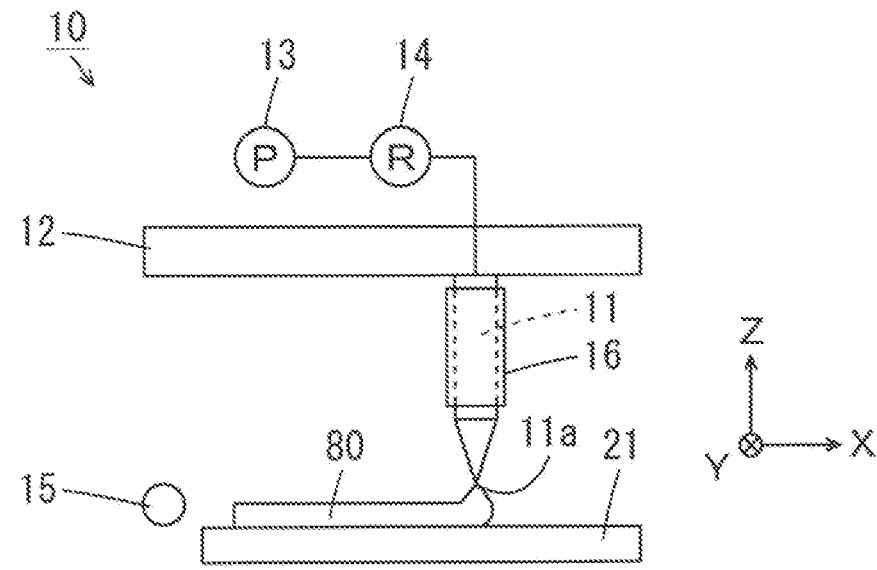

FIGS. 3A and 3B are schematic front views showing a configuration and an operation of the material supply unit 10. As shown in FIG. 3A, the material supply unit 10 further includes a compression device 13, a pressure regulating device 14 and a temperature regulating member 16 in addition to the one or plurality of dispensers 11, the driving device 12 and the cap member 15. The driving device 12 is provided above the auxiliary table 21 to extend in the X direction. The driving device 12 includes an actuator, for example, and holds the dispenser 11 from above to be movable in the X direction.

The compression device 13 includes a compressor, for example, and supplies a compressed gas (compressed air in the present example) into the dispenser 11 from the upper end of the dispenser 11. Thus, the photocurable composition 80 inside of the dispenser 11 is pressed and discharged from the discharge hole 11a to the upper surface of the auxiliary table 21. The pressure regulating device 14 includes a pressure regulator, for example, and regulates the pressure of the compressed gas to be supplied from the compression device 13 to the dispenser 11. Thus, the amount of the photocurable composition 80 to be discharged from the dispenser 11 is regulated.

The cap member 15 has a columnar shape that is rotatable about a rotation axis in parallel to the Y direction, and is held by a holding member (not shown) in the vicinity of one end in the X direction of the auxiliary table 21. A waiting position of the dispenser 11 is provided above the cap member 15. When the dispenser 11 is in the waiting position, the discharge hole 11a of the dispenser 11 is closed by an outer peripheral surface of the cap member 15. Thus, the tip of the dispenser 11 is protected, leakage of the photocurable composition 80 from the discharge hole 11a is prevented, and the amount of the photocurable composition 80 to be consumed can be reduced.

The cap member 15 and its holding member are preferably formed of a flexible material. In this case, the tip of the dispenser 11 is protected more reliably. A check valve that prevents returning of the photocurable composition 80 may be provided at a position farther upstream than the discharge hole 11a in the dispenser 11. In this case, the cap member 15 does not have to be provided in the material supply unit 10.

The temperature regulating member 16 includes a jacket heater, for example, and is attached to cover the outer peripheral surface of the dispenser 11. The temperature regulating member 16 regulates the temperature of the photocurable composition 80 stored in the dispenser 11. Thus, physicality of the photocurable composition 80 such as viscosity is suitably maintained, and the dispenser 11 can discharge the photocurable composition 80 efficiently.

When an air conditioner is provided in the optical fabricating apparatus 100, and the temperature of the entire optical fabricating apparatus 100 is regulated, the temperature regulating member 16 does not have to be provided in the material supply unit 10. Alternatively, also when a temperature regulating member such as a rubber heater is provided at part or all of the auxiliary table 21, the fabrication table 31 and the recoater 41 of FIG. 1, the temperature regulating member 16 does not have to be provided in the material supply unit 10.

During the operation of the material supply unit 10, the compressed gas is supplied into the dispenser 11 by the compression device 13, and the dispenser 11 is moved by the driving device 12 from the waiting position to the other end in the X direction of the auxiliary table 21. Thus, as shown in FIG. 3B, the photocurable composition 80 is discharged from the dispenser 11 and deposited on the auxiliary table 21 to extend in the X direction at a substantially uniform thickness.

After the dispenser 11 is moved to the other end in the X direction of the auxiliary table 21, the compression device 13 stops supplying the compressed air. Thus, the discharge of the photocurable composition 80 from the dispenser 11 is stopped. Thereafter, the dispenser 11 is returned to the waiting position by the driving device 12. When the dispenser 11 starts moving from the waiting position or returns to the waiting position, the cap member 15 rotates about the rotation axis as indicated by the arrow in FIG. 3A. Thus, the dispenser 11 is detached from the cap member 15 smoothly, and the dispenser 11 comes into contact with the cap member 15 smoothly.

While the waiting position is provided only in the vicinity of the one end in the X direction of the auxiliary table 21 in the above-mentioned configuration, the present invention is not limited to this. Waiting positions may be provided in the vicinity of the both ends in the X direction of the auxiliary table 21. In this case, it is not necessary that the dispenser 11 moves back and forth in the X direction when discharging the photocurable composition 80 to the auxiliary table 21, and the dispenser 11 may move from one waiting position to the other waiting position. Therefore, the photocurable composition 80 can be efficiently supplied to the auxiliary table 21. With this configuration, two cap members 15 may be respectively arranged in the vicinity of the one end and the other end in the X direction of the auxiliary table 21.

Figure 4:
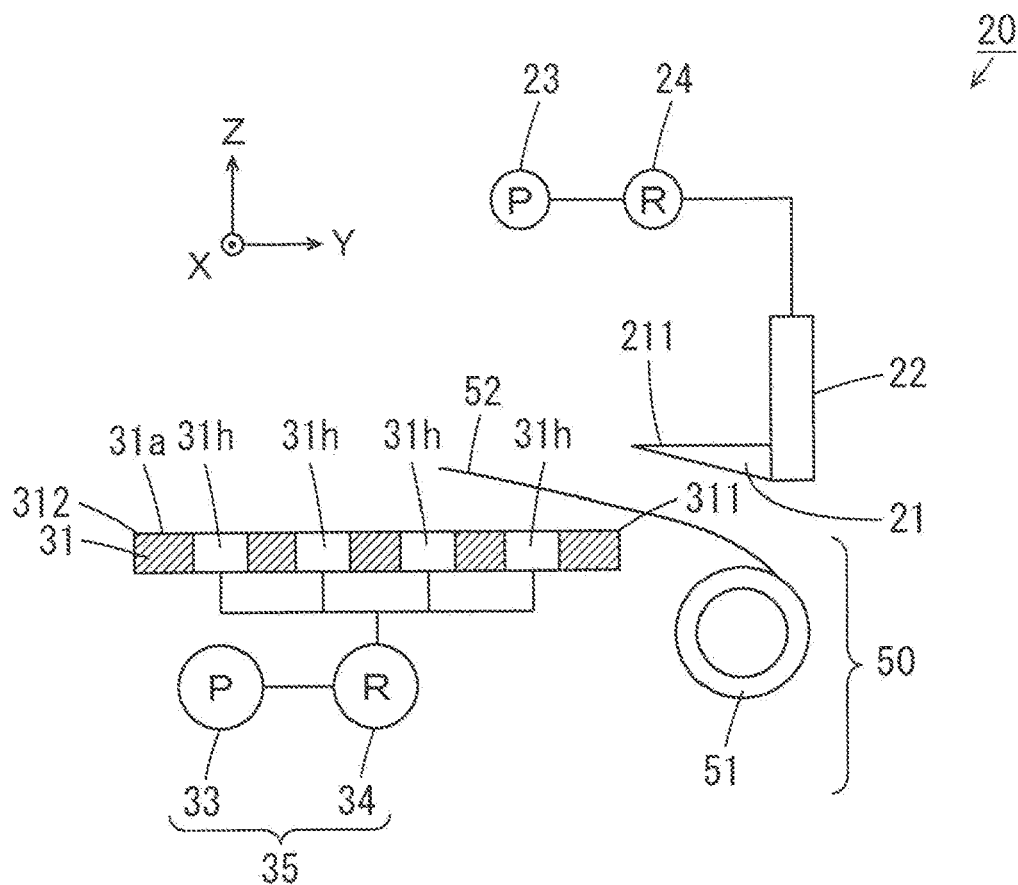
FIG. 4 is a schematic side view showing configurations of an auxiliary table unit, a fabrication table unit and a cover supply unit.
Figure 5:
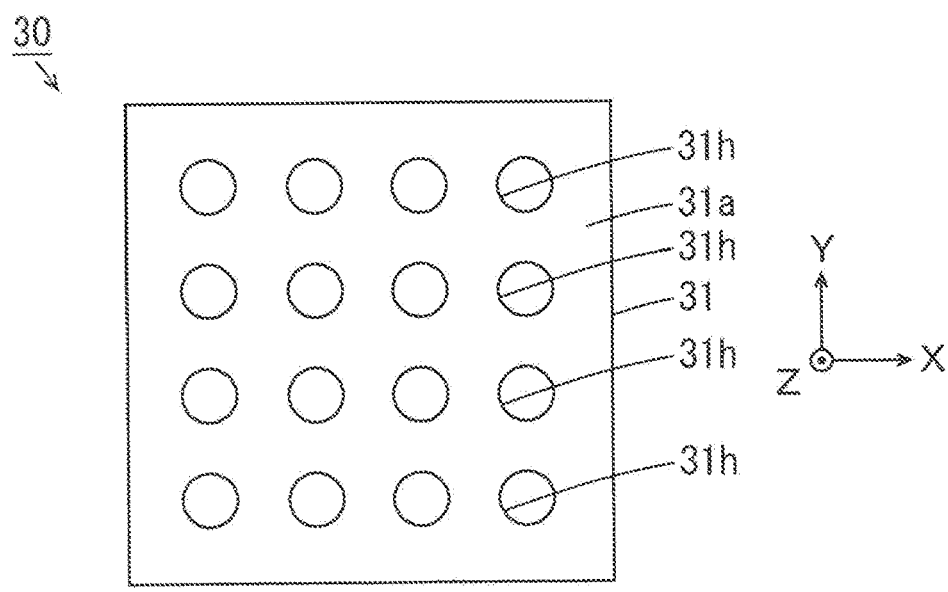
FIG. 5 is a schematic plan view of a fabrication table.

FIG. 4 is a schematic side view showing configurations of the auxiliary table unit 20, the fabrication table unit 30 and the cover supply unit 50. In FIG. 4, the schematic cross section of the fabrication table 31 is shown. FIG. 5 is a schematic plan view of the fabrication table 31.

As shown in FIG. 4, the auxiliary table unit 20 includes a compression device 23 and a pressure regulating device 24 in addition to the auxiliary table 21 and the driving device 22. The driving device 22 includes an air cylinder that is extendible and contractible in the Z direction, for example, and holds the auxiliary table 21 to be movable in the Z direction along a guide member (not shown).

The compression device 23 includes a compressor, for example, supplies gas to the driving device 22 and exhausts gas from the driving device 22. Thus, the auxiliary table 21 held by the driving device 22 is moved in the Z direction (an up-and-down direction) within a predetermined range. The pressure regulating device 24 includes a pressure regulator, for example, and regulates the pressure of the gas to be supplied from the compression device 23 to the driving device 22. Thus, a movement amount, a movement speed and a position in the Z direction of the auxiliary table 21 are regulated.

A waiting position of the auxiliary table 21 is provided at a position higher than the fabrication surface 31a of the fabrication table 31. During the operation of the auxiliary table unit 20, the auxiliary table 21 is moved by the driving device 22 from the waiting position to a position as high as the fabrication surface 31a. After that, manufacture of a fabrication object starts. The auxiliary table 21 is moved upward by the driving device 22 by a predetermined movement amount at a time as the manufacturing process of a fabrication object proceeds. Here, the predetermined movement amount is the thickness of each cured composition layer 81 of a fabrication object to be manufactured, and is from 5 μm to 200 μm, for example.

While the driving device 22 is constituted by an air cylinder in the present embodiment, the present invention is not limited to this. The driving device 22 may be constituted by a motor or a ball screw, for example. In this case, the compression device 23 and the pressure regulating device 24 are not provided in the auxiliary table unit 20.

The cover supply unit 50 includes the film roll 51 around which the elongated clear film 52 is cylindrically wound as a cover. While the cover is formed of a synthetic resin such as polyethylene-terephthalate, ionomer, polyvinyl chloride or polycarbonate in the present embodiment, the present invention is not limited to this. The cover may be formed of a glass material such as quartz glass or soda-lime glass, may be formed of a metallic material such as aluminum or steel, or may be formed of wood, paper or the like.

A user of the optical fabricating apparatus 100 draws the clear film 52 from the film roll 51 in the Y direction by a predetermined length and arranges the clear film 52 on the fabrication surface 31a. When the upper surface of the auxiliary table 21 is positioned as high as the fabrication surface 31a of the fabrication table 31, the clear film 52 is sandwiched by the edge 211 of the auxiliary table 21 and the edge 311 of the fabrication table 31. Thus, the position in the Y direction of the clear film 52 is maintained.

With this configuration, the fabrication surface 31a of the fabrication table 31 can be protected by the clear film 52. Further, the fabrication object can be taken out from above the fabrication surface 31a easily. Further, because the clear film 52 can be continuously drawn from the film roll 51, it is not necessary to prepare the clear film 52 fitted to the fabrication surface 31a of the fabrication table 31 each time the fabrication object is manufactured. Thus, user friendliness of the optical fabricating apparatus 100 is improved.

While the user manually arranges the clear film 52 on the fabrication surface 31a in the present embodiment, the present invention is not limited to this. For example, a motor for rotating the film roll 51 may be attached to a rotation shaft, and the clear film 52 may be automatically arranged on the fabrication surface 31a when the motor is controlled by the control device 70 of FIG. 1. In this case, the control device 70 feeds the predetermined length of the clear film 52 from the film roll 51 by controlling the motor before the manufacture of a fabrication object starts.

The more the clear film 52 is drawn, the smaller the diameter of the film roll 51 becomes. Therefore, the length of the clear film 52 to be fed from the film roll 51 may be calculated based on the diameter of the film roll 51 and the rotation angle of the motor. For example, when the diameter of the film roll 51 is 100 mm, the film roll 51 may controlled to rotate by $\frac{1}{50}$ rad in order to feed 1 mm of the clear film 52.

The driving device 32 of the fabrication table unit 30 includes a motor and a ball screw, for example, and holds the fabrication table 31 from below to be movable in the Z direction. One or a plurality of through holes 31h that penetrate in the Z direction are formed in the fabrication table 31. FIG. 5 shows only 16 through holes 31h.

The suction device 33 includes a vacuum pump, for example, and sucks the clear film 52 on the fabrication surface 31a through the one or plurality of through holes 31h of the fabrication table 31. Thus, the clear film 52 is held on the fabrication surface 31a by suction. The pressure regulating device 34 includes a pressure regulator, for example, and regulates a suction pressure with which the clear film 52 is sucked by the suction device 33. In this manner, the cover holding unit 35 holding the clear film 52 on the fabrication surface 31a is constituted by the suction device 33 and the pressure regulating device 34.

While the cover holding unit 35 includes the suction device 33 and the pressure regulating device 34 in the present embodiment, the present invention is not limited to this. The cover holding unit 35 may include an adhesive tape, for example. In this case, the clear film 52 is attached to the fabrication surface 31a by being attached to the fabrication surface 31a with the adhesive tape. Alternatively, the cover holding unit 35 may include a fixing member such as a vise or a chuck. In this case, the clear film 52 is held on the fabrication surface 31a by being sandwiched by fixing members.

Figure 6:
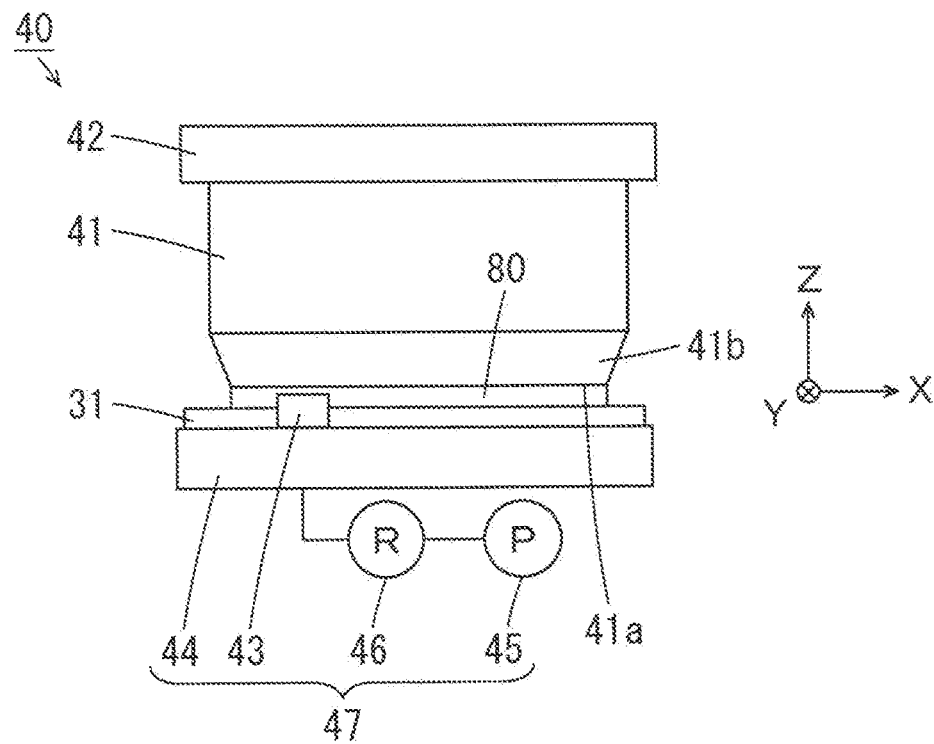
FIG. 6 is a schematic front view showing a configuration of a recoater unit.

FIG. 6 is a schematic front view showing a configuration of the recoater unit 40. As shown in FIG. 6, the recoater unit 40 includes a driving device 42, a driving device 44, a suction device 45 and a pressure regulating device 46 in addition to the recoater 41 and the cup member 43. The recoater 41 has a lower end 41a in parallel to the X direction, and an inclined surface 41b that extends from the lower end 41a and is inclined upward. The driving device 42 is provided above the fabrication table 31. This driving device 42 includes an actuator, for example, and holds the recoater 41 from above to be movable in the Y direction.

The cup member 43 has an upper opening and is arranged at a position opposite to the auxiliary table 21 with the fabrication table 31 interposed therebetween. A waiting position of the recoater 41 is provided in close proximity to the edge 312 of the fabrication table 31. The cup member 43 is provided such that the upper opening of the cup member 43 is in close proximity to the lower end 41a of the recoater 41 being in the waiting position. The driving device 44 is provided to extend in the X direction and arranged at a position opposite to the auxiliary table 21 with the fabrication table 31 interposed therebetween. The driving device 44 includes an actuator, for example, and holds the cup member 43 from below to be movable in the X direction.

The suction device 45 is connected to a bottom surface of the cup member 43. The suction device 45 includes a vacuum pump, for example, and sucks the contents of the cup member 43. The pressure regulating device 46 includes a pressure regulator, for example, and regulates a suction pressure by the suction device 45. A cleaning unit 47 that cleans the recoater 41 is constituted by the cup member 43, the driving device 44, the suction device 45 and the pressure regulating device 46.

During an operation of the recoater unit 40, the recoater 41 is moved by the driving device 42 in the Y direction from the waiting position to the position above the auxiliary table 21 of FIG. 1. At this time, the auxiliary table 21 is moved slightly downward such that the photocurable composition 80 (FIG. 2) on the auxiliary table 21 does not come into contact with the recoater 41. After the recoater 41 is moved to the position above the auxiliary table 21, the auxiliary table 21 is moved upward until the recoater 41 comes into contact with the photocurable composition 80.

Next, the recoater 41 is moved by the driving device 42 in the Y direction to the waiting position such that the photocurable composition 80 on the auxiliary table 21 is drawn and spread onto the fabrication surface 31a of the fabrication table 31. Thus, the photocurable composition 80 is applied onto the fabrication surface 31a to have a substantially uniform thickness. Hereinafter, a series of operations for drawing and spreading the photocurable composition 80 on the auxiliary table 21 onto the fabrication surface 31a by the recoater 41 is referred to as recoating.

The lower end 41a of the recoater 41 that has returned to the waiting position becomes close to an upper portion of the cup member 43. In this state, the cup member 43 is moved by the driving device 44 back and forth in the X direction, and the contents of the cup member 43 are sucked by the suction device 45. Thus, the photocurable composition 80 adhering to the lower portion of the recoater 41 is collected in the cup member 43, and the recoater 41 is cleaned. Further, the photocurable composition 80 that has been collected in the cup member 43 is sucked by the suction device 45 and sent to a collection device (not shown). With this configuration, unnecessary photocurable composition 80 adhering to the recoater 41 can be prevented from dripping on the fabrication surface 31a of the fabrication table 31 or the photocurable composition 80.

While the driving device 44, the suction device 45 and the pressure regulating device 46 are provided in the cleaning unit 47 in the present embodiment, the present invention is not limited to this. The upper portion of the cup member 43 may have a shape corresponding to the lower portion of the recoater 41, and the cup member 43 may be moved back and forth in the X direction while the upper portion of the cup member 43 is in contact with the lower portion of the recoater 41. Also in this case, the photocurable composition 80 adhering to the lower portion of the recoater 41 is removed. Thus, the recoater 41 can be cleaned. With this configuration, the driving device 44, the suction device 45 and the pressure regulating device 46 do not have to be provided in the cleaning unit 47.

Figure 7:
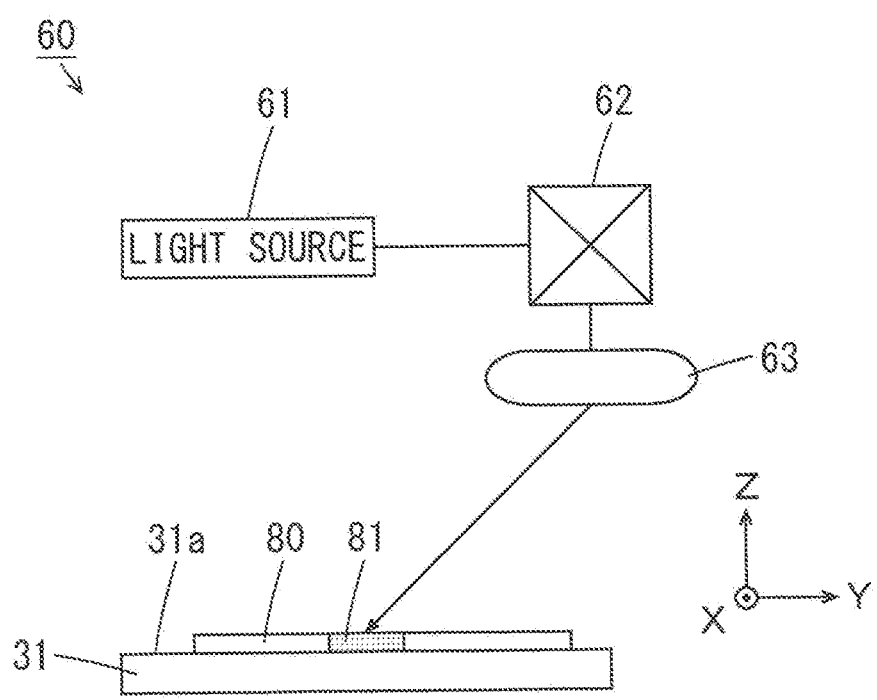
FIG. 7 is a schematic diagram showing a configuration of an exposure device.

FIG. 7 is a schematic diagram showing a configuration of the exposure device 60. As shown in FIG. 7, the exposure device 60 includes a light source 61, a scanning device 62 and a condensing member 63 and is arranged above the fabrication table 31. The light source 61 includes a laser generator, for example, and emits laser light having a wavelength within a photosensitive wavelength range of the photocurable composition 80. The photosensitive wavelength range of the photocurable composition 80 is a UVA range (315 nm to 400 nm), for example.

The scanning device 62 includes a galvanometer mirror, for example, reflects the light emitted by the light source 61 and scans on the fabrication surface 31a in the X and Y directions. The condensing member 63 is arranged on the path of the light that is reflected by the scanning device 62. The condensing member 63 includes and an fθ lens, for example, and converges the light on the fabrication surface 31a. The photocurable composition 80 on the fabrication surface 31a is irradiated with light in a predetermined pattern. Thus, the photocurable composition 80 is cured, and the cured composition layer 81 is formed.

While the scanning device 62 is constituted by a galvanometer mirror in the present embodiment, the present invention is not limited to this. The scanning device 62 may be constituted by another movable mirror such as an electromagnetic mirror. Alternatively, the scanning device 62 may be constituted by optical elements such as a plurality of mirrors or optical fibers, the optical elements being able to control an irradiating position of light by an NC (Numerically Controlled) table. Alternatively, a mask member in which a desired light-transmitting pattern is formed may be used instead of the scanning device 62. In this case, planar light such as non-converging light is emitted from the light source 61, so that batch exposure is performed.

Figure 8:
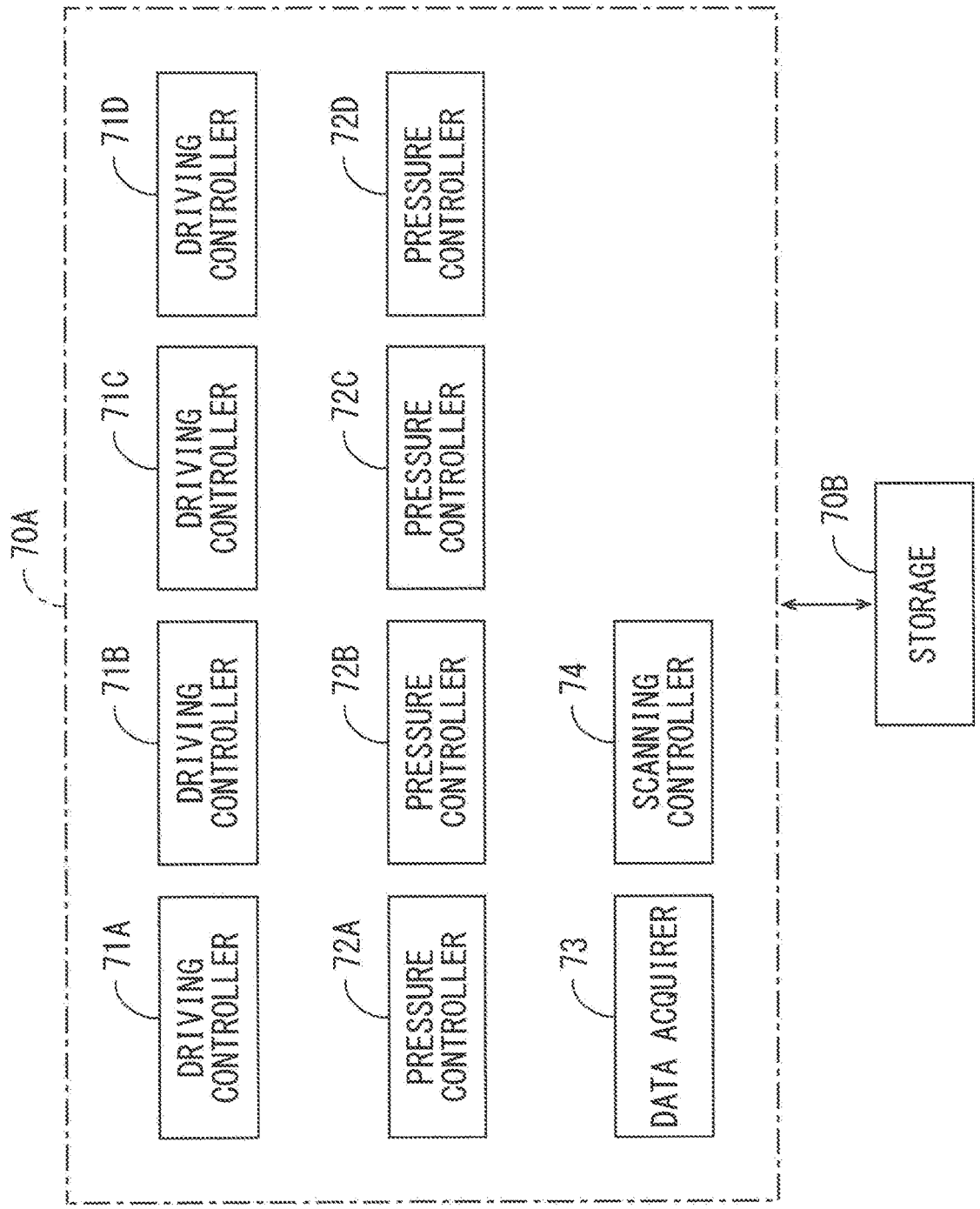
FIG. 8 is a block diagram showing a configuration of a control device.

FIG. 8 is a block diagram showing a configuration of the control device 70. As shown in FIG. 8, the control device 70 includes a main controller 70A and a storage 70B. The main controller 70A is constituted by a CPU (Central Processing Unit), for example, and controls various constituent elements of the optical fabricating apparatus 100 and performs data processing. The storage 70B includes a volatile memory or a hard disc, for example, and stores fabrication data indicating the three-dimensional shape of a fabrication object to be manufactured and a computer program.

The main controller 70A includes four driving controllers 71A to 71D, four pressure controllers 72A to 72D, a data acquirer 73 and a scanning controller 74. The main controller 70A executes a computer program stored in the storage 70B, so that functions of the driving controllers 71A to 71D, pressure controllers 72A to 72D, a data acquirer 73 and a scanning controller 74 are implemented.

The driving controller 71A controls the operation of the driving device 12 in order to move the dispenser 11 of FIGS. 3A and 3B in the X direction. The driving controller 71B controls the operation of the driving device 32 in order to move the fabrication table 31 of FIG. 1 in the Z direction. The driving controller 71C controls the operation of the driving device 42 in order to move the recoater 41 of FIG. 6 in the Y direction. The driving controller 71D controls the operation of the driving device 44 in order to move the cup member 43 of FIG. 6 in the X direction.

The pressure controller 72A controls the operation of the compression device 13 in order to discharge the photocurable composition 80 from the dispenser 11 of FIGS. 3A and 3B, and controls the operation of the pressure regulating device 14 in order to regulate the amount of the photocurable composition to be discharged. The pressure controller 72B controls the operation of the compression device 23 in order to move the auxiliary table 21 of FIG. 4 in the Z direction, and controls the operation of the pressure regulating device 24 in order to regulate its movement amount, movement speed and position.

The pressure controller 72C controls the operation of the suction device 33 in order to suck the clear film 52 of FIG. 4 and hold the fabrication surface 31a, and controls the operation of the pressure regulating device 34 in order to regulate its suction pressure. The pressure controller 72D controls the operation of the suction device 45 in order to suck the photocurable composition 80 and clean the recoater 41 of FIG. 6, and controls the operation of the pressure regulating device 46 in order to regulate its suction pressure.

The data acquirer 73 acquires one or a plurality of cross sectional data pieces indicating the shape of a cross section of each position in the up-and-down direction of a fabrication object based on the fabrication data stored in the storage 70B. The scanning controller 74 controls the operation of the scanning device 62 of FIG. 7 in order to expose the photocurable composition 80 in the shape of the cross section indicated by each cross sectional data piece acquired by the data acquirer 73.

(3) Fabricating Process

Figure 9:
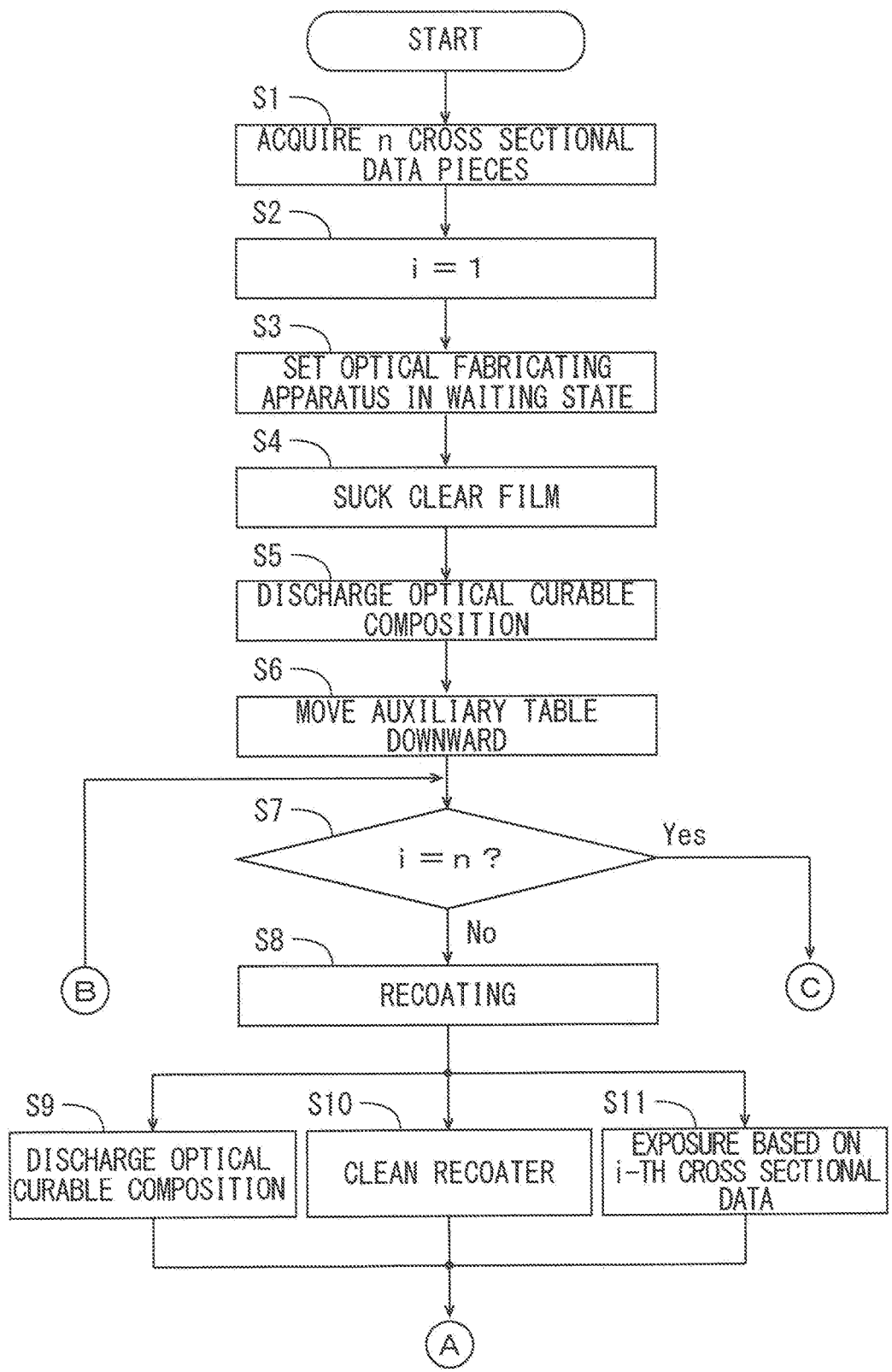
FIG. 9 is a flow chart showing the control by a main controller of FIG. 8 in a fabricating process of manufacturing a fabrication object.
Figure 10:
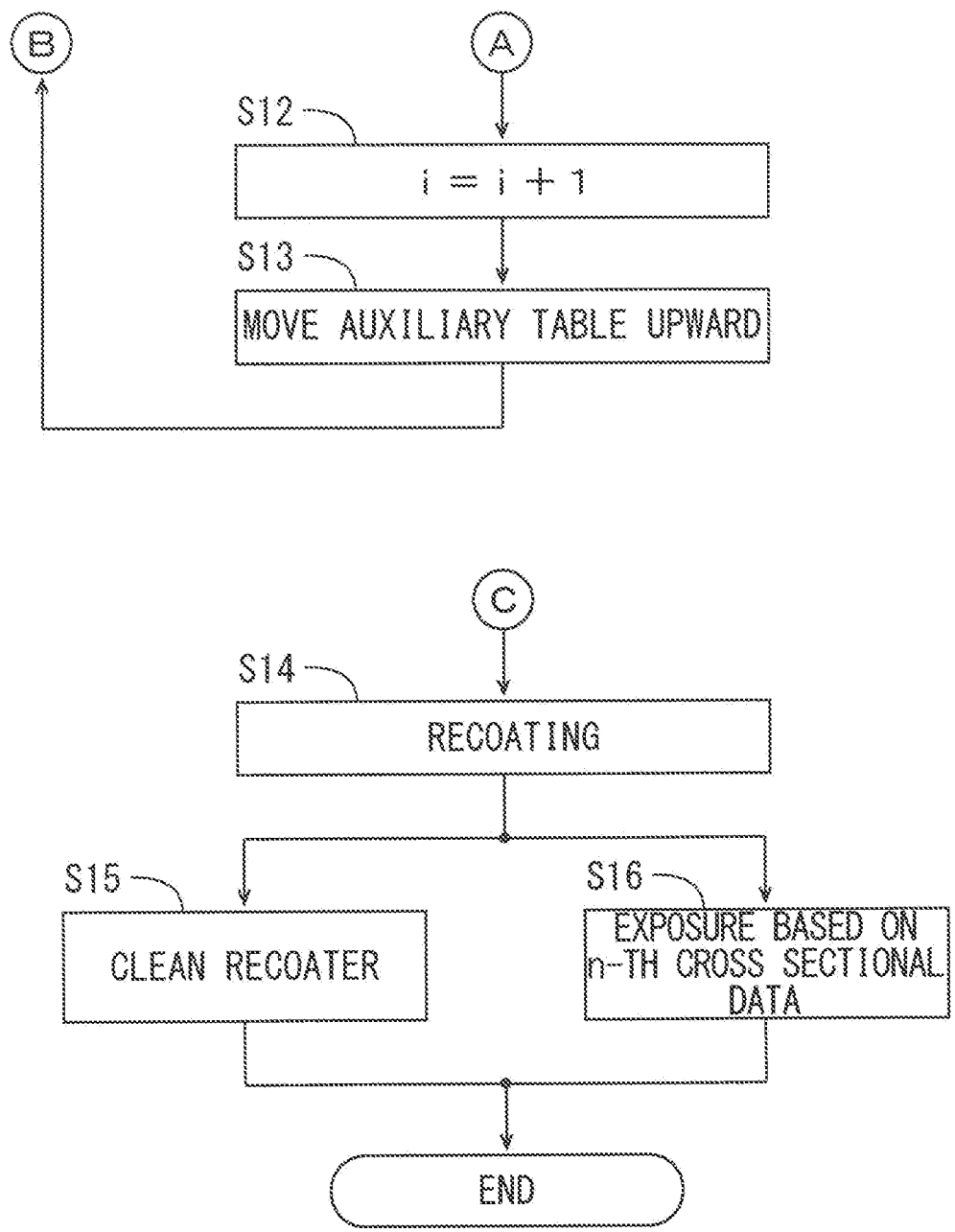
FIG. 10 is a flow chart showing the control by the main controller of FIG. 8 in the fabricating process of manufacturing the fabrication object.

FIGS. 9 and 10 are flow charts showing the control by the main controller 70A of FIG. 8 in the fabricating process of manufacturing a fabrication object. FIGS. 11A to 11D are schematic diagrams showing the operations of the fabricating apparatus 100 in the fabricating process. The fabricating process to be performed by the main controller 70A will be described with reference to the control device 70 of FIG. 8, the flow charts of FIGS. 9 and 10 and the optical fabricating apparatus 100 of FIGS. 11A to 11D.

First, the main controller 70A acquires n cross sectional data pieces (n is an integer that is 1 or larger than 1) based on a fabrication data piece of a fabrication object stored in the storage 70B (step S1). Here, each cross sectional data indicates a planar shape of each cured composition layer 81. The n acquired cross sectional data pieces are provided with sequential specific numbers from 1 to n from the bottom. The first cross sectional data piece corresponds to the bottom cured composition layer 81, and the n-th cross sectional data piece corresponds to the top cured composition layer 81. Next, the main controller 70A sets the value of a variable 'i' indicating the number of layers to 1 (step S2). The process of the steps S1 and S2 may be performed at any time point before the process of the step S7, described below.

Figure 11A:
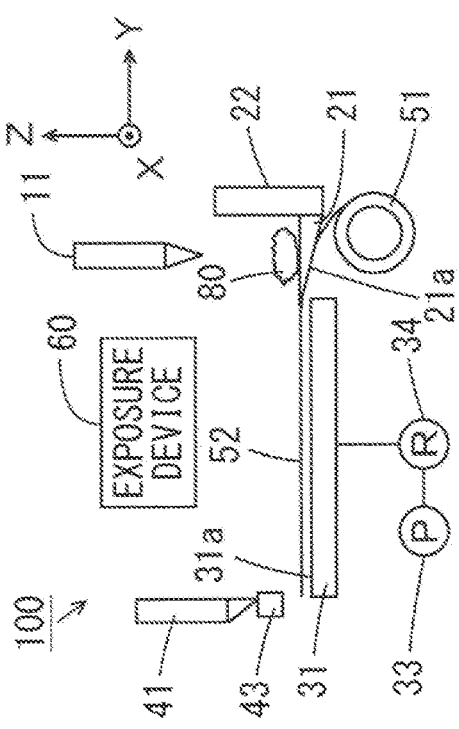
FIGS. 11A, 11B, 11C, and 11D are schematic diagrams showing operations of the optical fabricating apparatus in the fabricating process.

Subsequently, the main controller 70A sets the optical fabricating apparatus 100 in a waiting state as shown in FIG. 11A (step S3). Specifically, the main controller 70A respectively moves the dispenser 11, the auxiliary table 21 and the recoater 41 to the waiting positions. Here, the main controller 70A may adjust the position of the fabrication table 31 in the Z direction. Thereafter, the user draws a sufficient length of the clear film 52 from the film roll 51 and arranges the clear film 52 on the fabrication surface 31a.

Figure 11B:
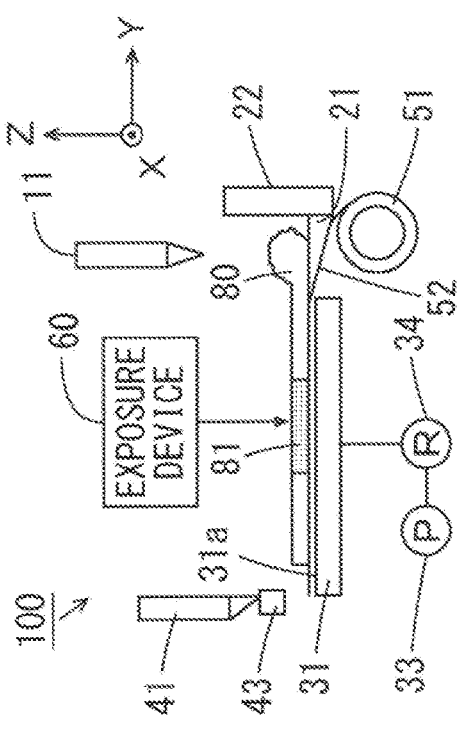

The main controller 70A allows the cover holding unit 35 to hold the clear film 52 on the fabrication surface 31a by suction (step S4). Next, as shown in FIG. 11B, the main controller 70A allows the dispenser 11 to discharge the photocurable composition 80 onto the auxiliary table 21 (step S5). Further, the main controller 70A moves the auxiliary table 21 downward (step S6). Thus, the clear film 52 is pressed by the pressing portion 21a of the auxiliary table 21 and prevented from deviating from its position on the fabrication surface 31a.

Figure 11C:
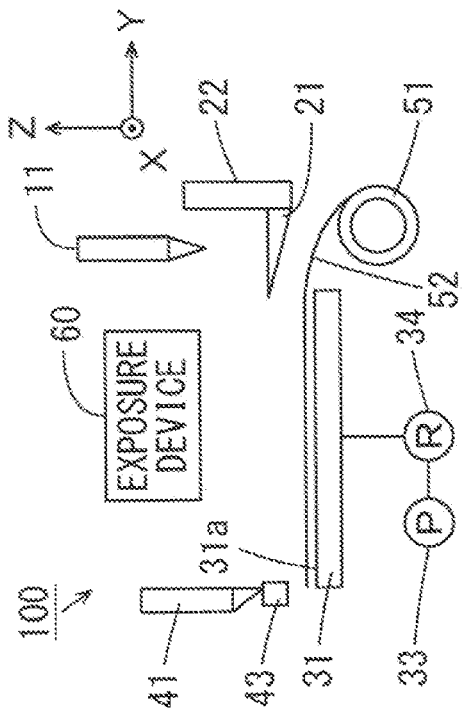

Subsequently, the main controller 70A determines whether the value of the variable 'i' is n (step S7). When the value of the variable T is not n, the main controller 70A carries out the recoating by the recoater 41 as shown in FIG. 11C (step S8). Thereafter, the main controller 70A discharges the photocurable composition 80 onto the auxiliary table 21 by the dispenser 11 (step S9). Further, the main controller 70A cleans the recoater 41 by the cup member 43 (step S10). Further, the main controller 70A exposes the photocurable composition 80 by the exposure device 60 based on the i-th cross sectional data piece (step S11).

Figure 11D:
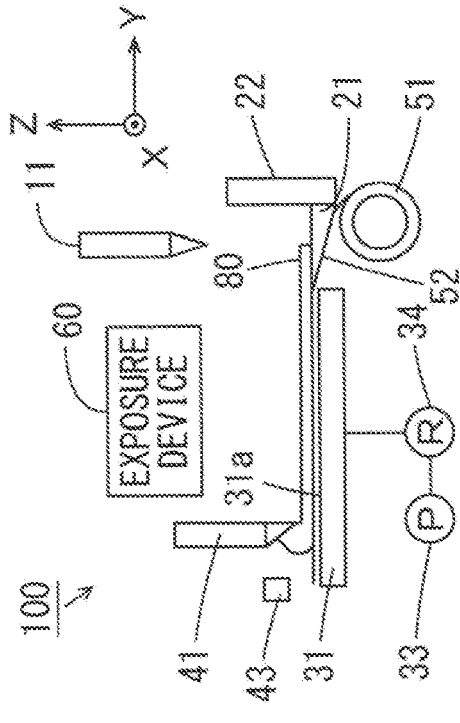

As shown in FIG. 11D, the processes of the steps S9 to S11 are simultaneously performed. Thus, the recoater 41 is maintained clean, and the cured composition layer 81 corresponding to the i-th cross sectional data piece is formed. Further, the photocurable composition 80 is prepared on the auxiliary table 21 in preparation for the formation of a cured composition layer 81 corresponding to the next cross sectional data piece.

Next, the main controller 70A increases the value of the variable 'i' by 1 (step S12). Further, the main controller 70A moves the auxiliary table 21 upward by the thickness of the cured composition layer 81 (from 5 μm to 200 μm, for example) (step S13). Either one of the processes of the steps S12, S13 may be performed first, or the processes of the steps S12, S13 may be performed simultaneously. Thereafter, the main controller 70A returns to the process of the step S7. The processes of the steps S7 to S13 are repeated until the value of the variable 'i' is n. Thus, the operations of FIGS. 11C and 11D are repeated alternately, and a fabrication object is formed with up to the cured composition layer 81 that is one below the top layer being stacked.

In the step S7, when the value of the variable 'i' is n, the main controller 70A carries out the recoating (step S14). Thereafter, the main controller 70A cleans the recoater 41 by the cup member 43 (step S15). Further, the main controller 70A exposes the photocurable composition 80 based on the n-th cross sectional data piece by the exposure device 60 (step S16).

Thus, the recoater 41 is maintained clean, and the top cured composition layer 81 is formed and stacked on the cured composition layer 81 that is one below the top layer. Thus, the fabrication object is completed. Finally, the user takes out the fabrication object from the fabrication surface 31a. Thus, the main controller 70A ends the fabricating process.

(4) Effects

Figure 12A:
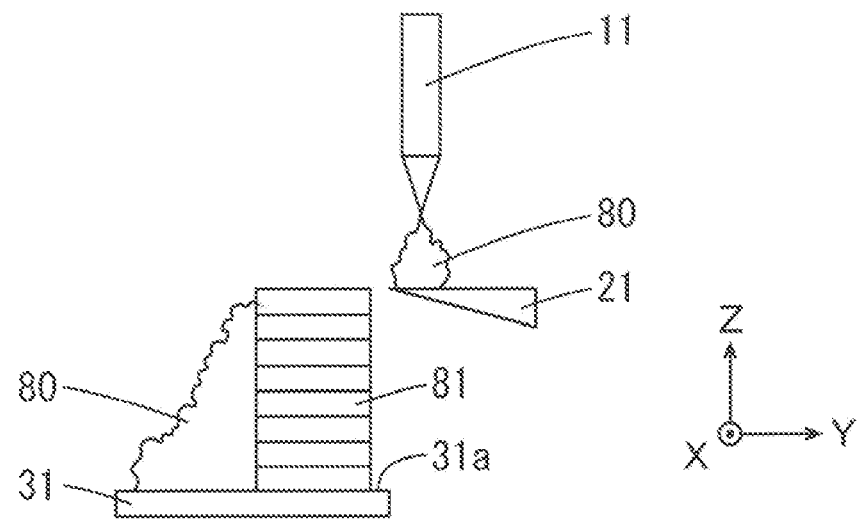
FIGS. 12A and 12B are diagrams for explaining the effects by the optical fabricating apparatus according to the present embodiment.
Figure 12B:
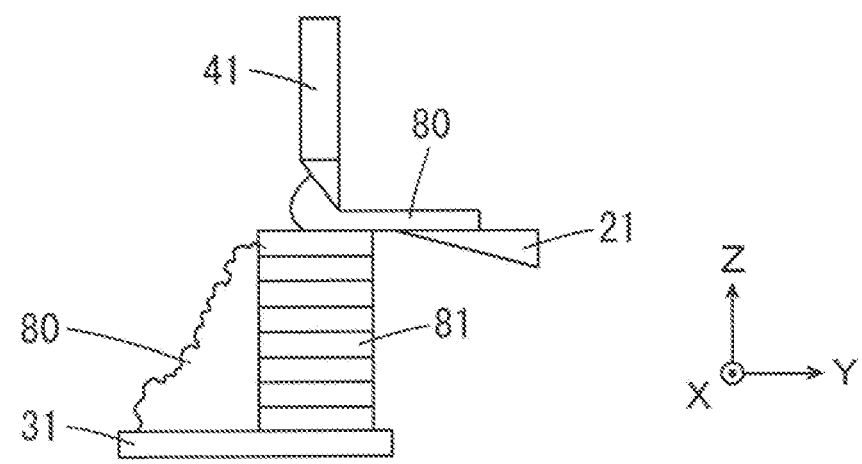

FIGS. 12A and 12B are diagrams for explaining the effects obtained by the optical fabricating apparatus 100 according to the present embodiment. In the optical fabricating apparatus 100 according to the present embodiment, the photocurable composition 80 is supplied onto the auxiliary table 21 by the dispenser 11 as shown in FIG. 12A. Thereafter, the auxiliary table 21 is moved in the up-and-down direction by the driving device 22 such that the height of the upper surface of the auxiliary table 21 coincides with the height of the upper surface of the cured composition layer 81 that has already been formed.

In this state, the photocurable composition 80 that has been supplied to the auxiliary table 21 is drawn and spread on the cured composition layer 81 on the fabrication table 31 by the recoater 41 as shown in FIG. 12B. The drawn and spread photocurable composition 80 is exposed, so that a new cured composition layer 81 is formed.

With this configuration, even when the number of the cured composition layers 81 is large, the height of the auxiliary table 21 is adjusted to the height of the top cured composition layer 81, whereby the photocurable composition 80 can be drawn and spread on the cured composition layer 81 from the upper surface of the auxiliary table 21. Thus, a fabrication object that is large in the height direction can be manufactured easily.

Figure 13:
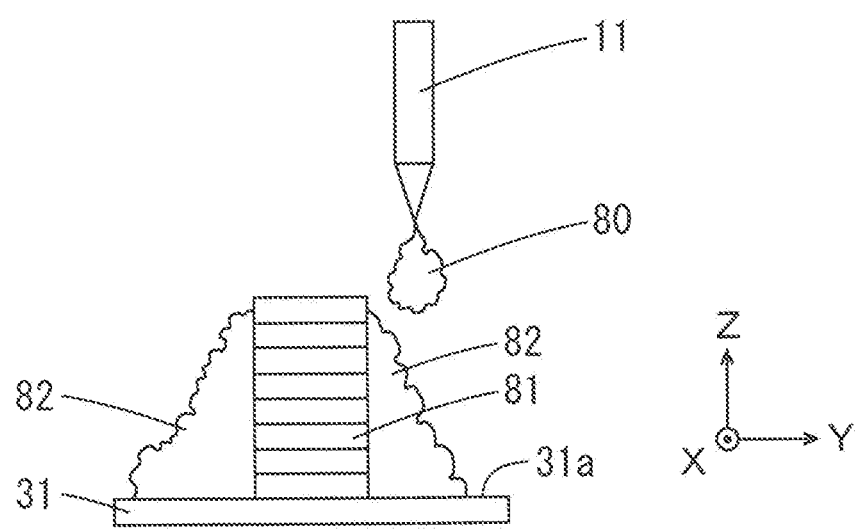
FIG. 13 is a diagram for explaining an optical fabricating apparatus in a comparative example.

FIG. 13 is a diagram for explaining an optical fabricating apparatus in a comparative example. In the optical fabricating apparatus of FIG. 13, a photocurable composition 80 is supplied onto a fabrication table 31 and drawn and spread on the fabrication table 31 by a recoater 41. Thereafter, the photocurable composition 80 is exposed, so that a cured composition layer 81 is formed. An uncured resin material 82 remains outside of the cured composition layer 81. Subsequently, a new photocurable composition 80 is supplied to the outside of the cured composition layer 81 and applied onto the cured composition layer 81 by the recoater 41. Thereafter, the photocurable composition 80 is exposed, so that a new cured composition layer 81 is formed on the cured composition layer 81.

The similar operations are repeated, so that a fabrication object made of a plurality of cured composition layers 81 is manufactured. However, the shape of an uncured resin material 82 outside of each cured composition layer 81 is not maintained. Therefore, the higher the height of a fabrication object is, the more difficult it becomes to draw and spread a new photocurable composition 80 that has been supplied onto the uncured resin material layer 82 on the cured composition layer 81 by the recoater 41. Therefore, it is difficult to manufacture a fabrication object that is large in the height direction.

(5) Other Embodiments (a) The optical fabricating apparatus 100 may have a remaining amount detection function of the photocurable composition 80 in the dispenser 11. For example, a scale for measuring its own weight may be provided at the dispenser 11. In this case, weight W1 that is measured when the photocurable composition 80 is not stored in the dispenser 11 and weight W2 that is measured when a prescribed amount of the photocurable composition 80 is stored in the dispenser 11 are measured in advance. Letting the weight to be measured by the scale be W3, the percentage of a remaining amount N is calculated by $(W3-W1)/(W2-W1) \times 100 [\%]$.

Further, when the calculated percentage N of a remaining amount is 20% or lower, for example, the warning indicating that the remaining amount is small may be output. The output of warning includes generation of warning sound by a buzzer, for example, a warning display by a character, an illustration or the like or a waning display by a lamp or the like. Thus, an occurrence of a manufacturing defect in a fabrication object due to a shortage of the remaining amount of the photocurable composition 80 can be prevented.

(b) In the above-mentioned embodiment, when a fabrication object is manufactured, the auxiliary table 21 is moved by the driving device 22 with respect to the fabrication table 31 in the up-and-down direction. However, the present invention is not limited to this. When a fabrication object is manufactured, the fabrication table 31 may be moved by the driving device 32 with respect to the auxiliary table 21 in the up-and-down direction.

(6) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the cured composition layer 81 is an example of a cured composition layer, the optical fabricating apparatus 100 is an example of an optical fabricating apparatus, the fabrication surface 31a is an example of a fabrication surface and the fabrication table 31 is an example of a fabrication table. The auxiliary table 21 is an example of an auxiliary table, the driving device 22 is an example of a relative moving means, the photocurable composition 80 is an example of a photocurable composition, the material supply unit 10 is an example of a supply means, and the recoater 41 is an example of a spreading member.

The exposure device 60 is an example of an exposure means, the discharge hole 11a is an example of a discharge hole, the dispenser 11 is an example of a dispenser, the cap member 15 is an example of a cap member, and the temperature regulating member 16 is an example of a temperature regulating member. The film roll 51 is an example of a roll, the cover supply unit 50 is an example of a cover supply means, the clear film 52 is an example of a cover, the cover holding unit 35 is an example of a cover holding means, and the through hole 31h is an example of a suction hole. The pressing portion 21a is an example of a pressing portion, the cleaning unit 47 is an example of a cleaning means, the cup member 43 is an example of a cup member, and the suction device 45 is an example of a suction device.

As each of constituent elements recited in the claims, various other elements having configurations or functions described in the claims can be also used.

INDUSTRIAL APPLICABILITY

The present invention can be effectively utilized for various types of optical fabricating using recoaters.

The invention claimed is:

1. An optical fabricating apparatus that manufactures a three-dimensional fabrication object by stacking cured composition layers in an up-and-down direction, comprising:
   a fabrication table that has a fabrication surface;
   an auxiliary table provided to be capable of being adjacent to the fabrication table;
   a relative mover that moves one of the fabrication table and the auxiliary table relative to another one of the fabrication table and the auxiliary table in the up-and-down direction to position an upper surface of the auxiliary table at a same height as the fabrication surface of the fabrication table and to position the upper surface of the auxiliary table at a same height as an upper surface of a cured composition layer spaced from the fabrication surface;
   a supplier that is movable in a predetermined direction and that supplies a photocurable composition onto the auxiliary table;
   a spreader that draws and spreads the photocurable composition that has been supplied onto the auxiliary table by the supplier on the fabrication surface of the fabrication table or on the upper surface of the cured composition layer from the upper surface of the auxiliary table with the upper surface of the auxiliary table positioned at the same height as the fabrication surface of the fabrication table or the same height as the upper surface of the cured composition layer;
   an exposure machine that exposes the photocurable composition on the fabrication surface of the fabrication table to form the cured composition layer; and
   a controller that controls the relative mover to position the upper surface of the auxiliary table at the same height as the upper surface of the cured composition layer, and that controls the supplier to move in the predetermined direction during the supply of the photocurable composition so as to deposit the photocurable composition to extend in the predetermined direction on the auxiliary table.

2. The optical fabricating apparatus according to claim 1, wherein
the supplier includes a dispenser that has a discharge hole through which the photocurable composition is discharged onto the auxiliary table using a syringe.

3. The optical fabricating apparatus according to claim 2, wherein
the supplier further includes a temperature regulator that is attached to the dispenser and regulates a temperature of the photocurable composition.

4. The optical fabricating apparatus according to claim 1, including a cover supplier that has a roll of a wound elongated cover, wherein
the cover supplier is arranged such that part of the cover is drawable from the roll to cover the fabrication surface of the fabrication table, and
the spreader draws and spreads the photocurable composition that has been supplied to the auxiliary table on the cover on the fabrication surface.

5. The optical fabricating apparatus according to claim 4, further comprising a cover holder that holds the cover on the fabrication surface of the fabrication table.

6. The optical fabricating apparatus according to claim 5, wherein
the fabrication table further has one or a plurality of suction holes that open in the fabrication surface, and
the cover holder holds the cover on the fabrication surface by sucking the cover through the one or plurality of suction holes of the fabrication table.

7. The optical fabricating apparatus according to claim 4, wherein
the auxiliary table has a pressing portion that presses the cover against the fabrication table.

8. The optical fabricating apparatus according to claim 1, further comprising a cleaner that removes the photocurable composition adhering to the spreader.

9. The optical fabricating apparatus according to claim 8, wherein
the cleaner includes
a cup that is in close proximity to or comes into contact with the spreader after the photocurable composition is drawn and spread by the spreader, and
a sucker that sucks the photocurable composition adhering to the spreader into the cup.

10. An optical fabricating method for manufacturing a three-dimensional fabrication object by stacking cured composition layers in an up-and-down direction, including the steps of:
supplying a first amount of photocurable composition onto an auxiliary table provided to be capable of being adjacent to a fabrication table;
positioning an upper surface of the auxiliary table at a same height as a fabrication surface of the fabrication table by moving one of the fabrication table and the auxiliary table relative to another one of the fabrication table and the auxiliary table in the up-and-down direction;
moving a supplier in a predetermined direction during the supply of the first amount of photocurable composition so as to deposit the first amount of photocurable composition to extend in the predetermined direction on the auxiliary table;
drawing and spreading the first amount of photocurable composition that has been supplied to the auxiliary table on the fabrication surface of the fabrication table from the upper surface of the auxiliary table by a spreader; and exposing the first amount of photocurable composition on the fabrication surface of the fabrication table by an exposure machine and forming a cured composition layer;

supplying a second amount of photocurable composition onto the auxiliary table;

positioning an upper surface of the auxiliary table at a same height as an upper surface of the cured composition layer by moving one of the fabrication table and the auxiliary table relative to another one of the fabrication table and the auxiliary table in the up-and-down direction;

moving the supplier in a predetermined direction during the supply of the second amount of photocurable composition so as to deposit the second amount of photocurable composition to extend in the predetermined direction on the auxiliary table; and drawing and spreading the second amount of photocurable composition that has been supplied to the auxiliary table on the upper surface of the cured composition layer from the upper surface of the auxiliary table by the spreader.

11. The optical fabricating apparatus according to claim 1, wherein the spreader includes a blade recoater.

12. The optical fabricating apparatus according to claim 1, further comprising the photocurable composition, wherein the controller controls the spreader to form a layer of the photocurable composition continuously extending from a part directly on the upper surface of the auxiliary table to a part directly on the fabrication surface of the fabrication table or the upper surface of the cured composition layer.

13. The optical fabricating method according to claim 10, wherein in the step of drawing and spreading the first or second amount of photocurable composition, the spreader forms a layer of the first or second amount of photocurable composition continuously extending from a part directly on the upper surface of the auxiliary table to a part directly on the fabrication surface of the fabrication table or the upper surface of the cured composition layer.

* * * * *